United States Patent [19]

Walker

[11] Patent Number: 5,596,030

[45] Date of Patent: Jan. 21, 1997

[54] AMIDE-CONTAINING SELF-EMULSIFYING EPOXY CURING AGENT

[75] Inventor: Frederick H. Walker, Doylestown, Pa.

[73] Assignee: Air Products and Chemicals, Inc., Allentown, Pa.

[21] Appl. No.: 538,671

[22] Filed: Oct. 3, 1995

Related U.S. Application Data

[62] Division of Ser. No. 355,149, Dec. 13, 1994.

[51] Int. Cl.$^6$ .............................. C08K 3/20; C08L 63/02
[52] U.S. Cl. .............................. 523/404; 528/93; 528/121
[58] Field of Search .............................. 523/404; 528/93, 528/121

[56] References Cited

U.S. PATENT DOCUMENTS

| | | | |
|---|---|---|---|
| 4,197,389 | 4/1980 | Becker et al. | 528/103 |
| 4,246,148 | 1/1981 | Shimp et al. | 260/18 EP |
| 4,315,044 | 2/1982 | Elmore et al. | 427/386 |
| 4,446,256 | 5/1984 | Hicks et al. | 523/402 |
| 4,539,347 | 9/1985 | DeGooyer | 523/404 |
| 4,608,405 | 8/1986 | DeGooyer | 523/404 |
| 4,608,406 | 8/1986 | Williams et al. | 523/424 |
| 5,032,629 | 7/1991 | Hansen et al. | 523/414 |
| 5,138,097 | 8/1992 | Speranza . | |
| 5,246,984 | 9/1993 | Darwen et al. | 523/404 |

FOREIGN PATENT DOCUMENTS

| | | |
|---|---|---|
| 2519390 | 11/1975 | Germany . |
| 4206392 | 9/1993 | Germany . |
| 1326435 | 8/1973 | United Kingdom . |

*Primary Examiner*—Melvyn I. Marquis
*Assistant Examiner*—D. Aylward
*Attorney, Agent, or Firm*—Michael Leach; William F. Marsh

[57] ABSTRACT

A new epoxy hardener composition is the product of the reaction of (A) a poly(alkylene oxide) monoamine or diamine with a molecular weight (Mn) of about 500 to 3000 and (B) a di- or polycarboxylic acid, in a ratio of moles of carboxylic acid to equivalents of amine of about 1:1 to 6:1 to yield an intermediate (C), which in a second step is reacted with (D) a di- or polyamine. The compositions of the invention are excellent emulsifiers of liquid epoxy resins in aqueous media without the addition of added surfactants or acidic compounds, and can be used to prepare water resistant water-borne coatings and related products from both liquid and solid epoxy resins, that possess long pot lives and contain relatively small amounts of volatile organic compounds.

26 Claims, No Drawings

AMIDE-CONTAINING SELF-EMULSIFYING EPOXY CURING AGENT

This is a division of application Ser. No. 08/355,149 filed 13 Dec. 1994.

TECHNICAL FIELD

This invention relates to water dispersible polyamine-epoxy adducts which can be used as a curative for both liquid and solid epoxy resin systems.

BACKGROUND OF THE INVENTION

Coatings based on a combination of epoxy resins and amine hardeners (curing agents) which react to form a crosslinked film have enjoyed widespread use for decades. Because of the combination of properties achievable they have developed strong market positions in those applications where a high degree of resistance to water, chemical reagents, or corrosive environments is required.

A good introduction to the general chemistry of epoxy resins is available in H. Lee and K. Neville, 'Handbook of Epoxy Resins" (1967, McGraw -Hill Inc.). Commercially available epoxy resins useful in coatings are frequently referred to as either liquid resin or solid resin. The commercially important solid epoxy resins have an epoxy equivalent weight (EEW) greater than about 450. Although much higher EEW epoxy resins are available, the resins employed in amine cured coatings generally have an EEW less than about 1000. At higher equivalent weights the resulting crosslink density is too low to give the desired properties. Commercially important liquid epoxy resins have an EEW of less than about 250, and more frequently less than about 200. Though much slower to dry than solid epoxies, they result in films with very high crosslink densities, and find utility where very chemically resistant coatings are required. Of course, they also require less solvent for application than traditional solvent borne formulations. There is also a class of epoxy resins sometimes referred to as semi-solid resins, with EEWs intermediate between liquid and solid. It should be realized that a reference to 'liquid' or 'solid' resin may refer not to the actual physical state of the resin, but to the resin's EEW range, and perhaps to the properties that may be anticipated with its use. Thus, an aqueous dispersion of an epoxy resin with an EEW of 500 may be referred to as a solid resin dispersion, even though it is in a liquid form.

Concerns over environmental pollution and the health risks associated with chemical exposure have resulted in an intense effort by coatings manufacturers and raw material suppliers to develop products that have lower volatile organic content (VOC). Solvents are required in coatings to, among other things, allow the inherently viscous materials which comprise the coating formulation to be applied in a manner that results in a continuous thin film that will harden or cure with the required appearance and physical properties. No single approach to reducing the solvent content in two component epoxy coatings has been found which results in a product with the high degree of performance in different applications that typify the traditional, high VOC products.

One method of lowering VOC is to replace some of the solvent with water. This approach has not been without drawbacks. They include an increased sensitivity of water-borne epoxies to water and corrosive environments, and relatively short pot lives.

It will also be appreciated by those skilled in the art that replacing a substantial amount of solvent with water does not result in a true solution of the film forming components of an epoxy coating. To prevent phase separation and maintain a dispersed state of colloidal dimensions, it is necessary to impart an energy barrier to the agglomeration of the colloidal particles. There are two generally recognized means to accomplish this. The first is to surround the particles with electrically charged species of like sign. In water-borne epoxy coatings it is possible to incorporate charged species with the use of ionic surfactants, but more commonly this is accomplished by adding a compound of sufficient acidity to react with the amine to form a substantial equilibrium concentration of alkyl ammonium ion. Acids such as acetic acid and the like are frequently employed. Such an approach is employed in U.S. Pat. No. 4,246,148; U.S. Pat. No. 4,539,347; U.S. Pat. No. 4,608,405 and U.S. Pat. No. 5,246,984. Adding acids such as acetic acid or increasing their use level in some cases can also enhance the pot life of a water-borne epoxy, probably either by slowing the overall rate of the amine/epoxy reaction, or by imparting additional colloidal stability. In some cases, the ammonium containing curing agent is combined with already emulsified epoxy resins such as those described below, or in some cases the ammonium containing curing agent is used to directly emulsify the epoxy resin. Unfortunately, water-borne epoxy coatings made by this approach do not have the same degree of water and corrosion resistance of traditional epoxy coatings. Also, systems that rely on the ammonium containing curing agent as the primary emulsifier of the epoxy resin tend to suffer from quite short pot lives.

The other general method of imparting colloidal stability in an aqueous environment is to surround the particles with polymeric chains, such as polyethylene oxide chains, which have a high degree of water solubility. One way of practicing this method of stabilization is to add a conventional nonionic surfactant to the epoxy resin. There are commercially available products that consist of a pre-emulsified combination of low molecular weight (liquid) epoxy resin and nonionic surfactant, or a similar combination which is emulsified by the resin user. Sometimes, special block copolymer surfactants are employed that are designed to have one block highly compatible with the epoxy resin employed, such as described in U.S. Pat. No. 4,446,256.

A different method for nonionic stabilization can be employed as disclosed in U.S. Pat. No. 4,315,044 and U.S. Pat. No. 4,608,406. The diglycidyl ether of a poly(alkylene oxide) diol is incorporated in the epoxy resin advancement of a diphenol and a di- or polyglycidyl ether. In this way, water soluble chains become chemically attached to the advanced, solid epoxy resin, which is then converted into an aqueous dispersion by the addition of water and co-solvents and the application of shear.

Also known in the art are water-borne poly(alkylene oxide) epoxy hardeners with chemically attached nonionic emulsifying chains. A hardening agent for an aqueous epoxy resin composition comprising a reaction product of (a) at least one polyepoxide compound, (b) at least one polyalkylene polyether polyol and (c) at least one compound selected from the group consisting of aliphatic, cycloaliphatic, and heterocyclic polyamines is described in U.S. Pat. No. 4,197,389.

A curing agent for epoxy resins showing good water compatibility is described in DE 4,206,392. It consists of (A) polyamidoamines obtained by polycondensation of (a) dicarboxylic acids that contain oxyalkylene groups or their derivatives with (b) polyamines that contain at least two amino groups condensable with (a), (B) polyamines with at least two secondary amino groups and (C) adducts from (c) polyepoxide compounds and (d) polyalkylene polyether polyols.

Water-borne epoxy curing agents which are essentially adducts of diglycidyl ethers of polyethers with polyamines are described in GB 1,326,435. Exemplary amines are the polyethylene amines.

U.S. Pat. No. 5,032,629 describes a hardening agent for epoxy resins which is prepared in two steps. In the first step at least one member of the group consisting of polyalkylene polyether monoamines and diamines and polyamines with a mean molecular weight of 148 to 5000 is reacted with at least one member of the group consisting of diepoxy compounds and polyepoxy compounds in a ratio of hydrogen atoms bound to nitrogen and capable of reaction with epoxide to epoxides of di- or polyepoxy compounds of 1:1.4 to 6. In the second step, at least one member of the group consisting of primary and secondary aliphatic, araliphatic, cycloaliphatic, aromatic, and heterocyclic mono-, di- and polyamines is reacted with the product of the first step at a ratio of reactive epoxide groups to hydrogen atoms on nitrogen of 1:2 to 10.

Perhaps most relevant to the present invention is DE 2,519,390 which discloses a water-borne polyamide curing agent which is made by reacting a polycarboxylic acid with polyamines. At least 10 mole % of the polyamines are poly(alkylene oxide) amines. According to calculations, Example 5 shows all the components being reacted together in a 0.95:1 ratio of moles of diacid to equivalents of polyether amine nitrogen.

SUMMARY OF THE INVENTION

The present invention provides a water compatible poly(alkylene oxide)amide composition and curable coating compositions comprising a blend of such poly(alkylene oxide)amide composition and a polyepoxide.

The poly(alkylene oxide)amide composition comprises the reaction product of (A) a poly(alkylene oxide) mono- or diamine having a number average molecular weight (Mn) of 500 to 3000 and (B) a polycarboxylic acid in a ratio of moles of polycarboxylic acid to equivalents of amine of about 1:1 to 6:1 to yield an intermediate (C) which is reacted with (D) a polyamine. The amount of the poly(alkylene oxide) monoamine or diamine used to produce intermediate (C) should be sufficient to provide a stable solution or emulsion of the epoxy hardener composition in an aqueous medium, i.e., in water or a water-cosolvent mixture.

This resulting polyamide reaction product is readily dispersible in the aqueous media and is capable of dispersing liquid and solid polyepoxide resins in such aqueous media. Thus, another embodiment of the present invention is a curable coating composition comprising the poly(alkylene oxide)amide composition and a polyepoxide resin.

The compositions of this process are similar to those of DE 2,519,390 except that the poly(alkylene oxide) amine is reacted with excess polycarboxylic acid in a first step and then with a large excess of polyamine in a second step. In this manner, the poly(alkylene oxide) amine is completely or nearly completely covalently attached to the polycarboxylic acid and eventually to the hardener and the final film network. Water sensitivity from the poly(alkylene oxide) chain should be minimized and all of the poly(alkylene oxide) chains in the hardener will be part of an amphophilic molecule, and hence surface active.

The poly(alkylene oxide)amides are excellent emulsifiers of liquid polyepoxide resins in aqueous media without the addition of added surfactants or acidic compounds and can be used to prepare water resistant water-borne coatings and related products from both liquid and solid polyepoxide resins that possess long pot lives and contain relatively small amounts of VOC.

DETAILED DESCRIPTION OF THE INVENTION

According to the invention the poly(alkylene oxide)amide composition comprises the reaction product of (A) a poly(alkylene oxide) monoamine or diamine having a number average molecular weight (Mn) of 500 to 3000 and (B) a polycarboxylic acid in a ratio of moles of polycarboxylic acid to equivalents of amine of about 1:1, preferably 1.3:1, to 6:1 to yield an intermediate (C). The amount of poly(alkylene oxide) monoamine or diamine used in producing intermediate (C) represents that amount sufficient to afford stable solutions or emulsions of the final curing agent in an aqueous medium, and to afford an emulsion of the curing agent and epoxy resin in an aqueous medium with sufficient stability to be a useful coating vehicle, e.g., 15 to 40 wt %, preferably 18 to 25 wt %, of the final hardener composition solids. In a second step intermediate (C) is reacted with (D) a polyamine in an amount that ensures the requisite amount of poly(alkylene oxide) amine in the final composition.

The poly(alkylene oxide) amines used in the first step comprise poly(alkylene oxide) chains that are terminated on one end or on both ends with amine groups, monoamines and diamines, respectively. It is necessary that the amine groups have at least one active hydrogen; i.e., they must be 1° or 2° amines. The monoamines are preferred to the diamines, because at equivalent molecular weights, their use should result in lower viscosity hardeners, and because it is believed that the monofunctional chains are more effective stabilizers at equal molecular weight. The poly(alkylene oxide) can be derived from ethylene oxide, propylene oxide, or butylene oxide, or mixtures of the above either in random or block copolymer forms. However, it is necessary that the poly(alkylene oxide) chains, or at least suitably long sections of these chains to act as steric stabilizers, be soluble in the continuous phase medium of the final coating formulation. Thus, as the VOC of the final formulation is reduced by elimination of cosolvent, it will be necessary to raise the level of ethylene oxide in the copolymer, since it is the only poly(alkylene oxide) that is completely water soluble at the necessary molecular weights. The number average molecular weight (Mn) of the poly(alkylene oxide) amine is about 500 to about 3000, preferably about 800 to about 1500. Lower molecular weights result in colloidal instability, while higher molecular weights increase viscosity of the product and require lower solids in the final formulation.

Specific examples of suitable monoamines are the Jeffamine® M-600, Jeffamine M-1000, Jeffamine M-2005, and Jeffamine M-2070 amines. Specific examples of suitable diamines are Jeffamine D-2000, Jeffamine ED-600, Jeffamine ED-900, and Jeffamine ED-2001 amines. The Jeffamine materials are commercially available from the Huntsman Corp. The preferred monoamine is Jeffamine M-1000 amine which is a monoamine terminated block copolymer of propylene oxide and ethylene oxide having an Mn=1200, based on its amine titer.

The poly(alkylene oxide) amine can range from about 15% to about 40% of the final hardener composition (based on solids). If too little poly(alkylene oxide) amine is employed, the hardener has insufficient solubility in the continuous phase of the formulation, resulting in inadequate pot life and stability. At high levels, water resistance of the derived coatings will be adversely affected. The preferred range is about 18% to about 25%.

The polycarboxylic acid of the first step can be any carboxylic acid containing two or more carboxylate functionalities and from about 3 to about 40 carbons; however, the dicarboxylic acids are much preferred. Functional equivalents of dicarboxylic acids for purposes of this invention include ester derivatives of the dicarboxylic acids or any other derivative that can react with an amine to form an amide, providing that other products of the reaction can either be removed, or do not harm the properties of the final product. Anhydrides of the dicarboxylic acid can also be employed. Mixtures of dicarboxylic acids can also be employed.

Specific examples of suitable dicarboxylic acids containing 3 to 12 carbon atoms include the saturated dicarboxylic acids such as malonic acid, succinnic acid, glutaric acid, adipic acid, azeleic acid, 1,8-octanedicarboxylic acid, 1,10-decanedicarboxylic acid, 1,12-dodecanedicarboxylic acid, and the like, as well as alkyl substituted derivatives of the above and specific examples of suitable aromatic dicarboxylic acids include phthalic acid, isophthalic acid, and terephthalic acid.

Unsaturated dicarboxylic acids can also be employed, including dimer acids. The dimer acids are prepared by dimerization of fatty acids such as tall oil fatty acid and the like. They are complex mixtures that also include some monofunctional and higher functional carboxylic acids. It should be recognized that the average functionality of such a mixture may not be exactly 2. However, average functionality far less than two will result in the formation of a large amount of the amide of monofunctional acid and poly(alkylene oxide) amine. This product will not be reacted into the final crosslinked network, and its presence in large amounts would be expected to reduce water resistance. Use of polycarboxylic acids with a functionality much greater than 2 would be expected to increase the viscosity of the hardener to an unacceptable degree due to chain branching on reaction with amine in the second step although their use in small amounts may be acceptable, especially in combination with a dicarboxylic acid. The dimer acids are well known in the literature, and well described in DE 2,519,390.

In the following examples, the compositions are all based on a dimer fatty acid. In practice that results in a product that yields a very flexible coating, but also one that is fairly slow to cure. This is probably a result of the low Tg imparted to the system through the incorporation of dimer acid. In cases where a faster drying coating is required, it would be preferred to use one or more of the lower molecular weight diacids given above perhaps in mixture with a dimer acid. The preferred diacids would be those containing 3 to 12 carbon atoms such as malonic acid, succinnic acid, glutaric acid, adipic acid, azeleic acid, 1,8-octanedicarboxylic acid, 1,10-decanedicarboxylic acid, 1,12-dodecanedicarboxylic acid, phthalic acid, isophthalic acid, and terephthalic acid. If greater flexibility is required in the final coating, it would prove possible to improve it by including a flexible diamine such as Jeffamine D400 or D2000 in the B side of the final formulation.

The ratio of moles of polycarboxylic acid to equivalents of amine in the first step of the process should be kept high enough so that not too many polyamides are formed that have two or more polyether chains attached to a single di- or multifunctional carboxylic acid, which would be expected to reduce water resistance. It should be kept low enough so that the required level of poly(alkylene oxide) is incorporated into the composition while ensuring that the viscosity of the final product is low enough to produce workable compositions below the required VOC since excess carboxylic acid serves to polymerize the amines of the second step. It will be apparent to those skilled in the art that the second requirement is dependent upon the functionality of the components in the reaction, since the reaction of materials of high functionality leads to higher molecular weights than lower functionality materials at the same molar ratios. Accordingly, the ratio of moles of polycarboxylic acid to equivalents of amine should be about 1:1 to 6:1, with the preferred range being about 1.3:1 to about 2.6:1. It is clear that by specifying the total percent of poly(alkylene oxide) amine in the composition, and the ratio of poly(alkylene oxide) amine to dicarboxylic acid, that the total composition is fixed.

Polyamines useful in the second step contain at least two nitrogen atoms per molecule and at least two and preferably at least three active hydrogens attached to nitrogen atoms per molecule. Useful amines include aliphatic, araliphatic, aromatic, cycloaliphatic, and heterocyclic di- and polyamines. Examples include the polyethylene amines (ethylene diamine, diethylene triamine, triethylene tetramine, pentaethylene hexamine and the like), 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazine, the poly(alkylene oxide) diamines and triamines (such as for example Jeffamine®D-230, Jeffamine D-400, Jeffamine D-2000, Jeffamine D-4000, Jeffamine To403, Jeffamine EDR-148, Jeffamine EDR-192, Jeffamine C-346, Jeffamine ED-600, Jeffamine ED-900, and Jeffamine ED-2001 ), meta-xylylene diamine, phenylene diamine, 4,4'-diaminodiphenyl methane, toluene diamine, isophorone diamine, 3,3'-dimethyl-4,4'-diaminodicyclohexyl methane, 4,4'-diaminodicyclohexyl methane, 2,4'-diaminodicyclohexyl methane, the mixture of methylene bridged poly(cyclohexyl-aromatic)amines (also known as MBPCAA) described in U.S. Pat. No. 5,280,091, and polyaminoamides. Mixtures of the above amines may also be employed.

The preferred amines for use in the invention are 4,4'-diaminodicyclohexyl methane, and particularly the mixture of methylene bridged poly(cyclohexyl-aromatic)amines described in U.S. Pat. No. 5,280,091.

If desired, the amine hydrogen functionality of the first or second amine component or their combined product can be reduced in order to further improve pot life by reducing the reactivity of the amine or enhancing the compatibility of the curing agent with the epoxy resin. This can be accomplished in several ways well known to those skilled in the art. The first method is to react a portion of the amine hydrogen with a monoepoxide. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, and 2-ethylhexanol and the like. The second method is to react a portion of the amines with an aidehyde containing about 1–8 carbons, such as formaldehyde, butyraldeyde, benzaldehyde, and the like. A third method is to condense a portion of the amines with a monocarboxylic acid having from 1 to about 18 carbons such as acetic acid, benzoic acid, or one of the fatty acids such as stearic acid or oleic acid. A fourth method is to react a portion of the amines with an unsaturated compound that contains an electron withdrawing group that activates the double bond to undergo the Michael reaction with an amine. Examples of useful unsaturated compounds of this type include acrylonitrile, acrylamide, N-methylol acrylamide, and the like.

The ratio of equivalents of amine to equivalents of carboxylate in the final step must be kept high enough so that the molecular weight of the product is not built up to too great an extent, causing a too high viscosity. However, it must be kept low enough to achieve the desired level of poly(alkylene oxide) amine content in the hardener. It will be apparent to those skilled in the art that the first requirement is dependent upon the functionality of the components in the reaction, since the reaction of materials of high functionality leads to higher molecular weights than lower functionality materials at the same molar ratios. The minimum ratio of equivalents of amine to moles of carboxylic acid is about 5, with the preferred minimum ratio being about 15.

If desired, additional polyamine, the same or different, may be blended into the hardener composition after the second reaction is complete.

Also contemplated as the functional equivalent to the second step of reacting the total amount of polyamine with the carboxylate-containing intermediate (C), is to divide the total polyamine amount into two portions, the first being an amount sufficient to provide a ratio of equivalents of amine to moles of carboxylic acid of at least about 5. This first portion is reacted in the second step with the carboxylate-containing intermediate (C) followed by the addition of the remaining, or second portion, of the polyamine to the hardener composition after the second reaction is complete.

Normally, to blend additional polyamine into the product of the second reaction would result in a higher viscosity product than would be obtained if all of the polyamine were present when the carboxylate-containing intermediate is added. However, it will be recognized by those skilled in the art that the difference will be slight as long as a large molar excess of amine to epoxy is present in the first portion.

Furthermore, it is possible to impart certain desirable properties to the final coating by blending in amines that have different properties than the amine used in the reaction with the polycarboxylic acid and poly(alkylene oxide) amine reaction product. For example, the flexibility and impact resistance of the coating can be improved by blending in a portion of Jeffamine D400 or D2000 amine. When blending in additional amines, it is important that the final level of poly(alkylene oxide) amine in the resulting product be sufficient to impart the necessary stability to the system as described above.

Both reactions in the preparation of the hardener can be conducted over a wide temperature range, from about 100° C. to 300° C., with the preferred temperature about 180° C. to 260° C. The temperature required will usually be determined by the temperature necessary to remove water from the reaction mixture. By the application of vacuum, the required temperature can be reduced substantially below the temperatures employed in the example.

Another method to reduce the reaction temperature is to substitute esters derived from the dicarboxylic acids and alcohols containing from 1 to about 6 carbon atoms for the dicarboxylic acids. The products of such a substitution are the same amides plus the alcohol. The alcohol can either be removed from the reaction mixture by distillation at atmospheric or reduced pressure, or it can be left in if its presence is acceptable in the final formulation.

To minimize viscosity of the final product, it is preferred to add the poly(alkylene oxide) amine to the carboxylic acid in the first step, and to add the resulting intermediate to the polyamine in the second step. It will frequently be desirable to dilute the final product with a solvent so that the final product will be in a more convenient, less viscous form. The best solvents are solvents that are useful in the formulation of the final coating, such as those described below. The preferred solvents are the glycol ethers described below, and the most preferred solvent is ethylene glycol monopropyl ether (EP).

The curing agents, or hardeners, of this invention are useful in applications requiring a relatively thin film of cured epoxy resin, such as coatings and adhesives. They are used to cure resins or mixtures of resins containing 1,2-epoxy groups. The epoxy resins or epoxy resin mixture may be liquid or solid in nature, and have an epoxide equivalent weight (EEW) based on solids of from about 150 to about 1000, preferably from about 156 to about 700. Usually the resin mixture will consist of di- or polyepoxide resins. The most commonly used di- or polyepoxide resins are those based on the diglycidyl ether of bisphenol-A, the diglycidyl ether of bisphenol F and the diglycidyl ether of an epoxy novolac derived from a phenol and formaldehyde with an average functionality of about 2 to 4. They are well known in the industry, and described in Y. Tanaka, "Synthesis and Characteristics of Epoxides", in C. A. May, ed., *Epoxy Resins Chemistry and Technology* (Marcel Dekker, 1988). This reference also describes many other epoxy resins that while less commonly encountered and usually more expensive than the diglycidyl ether of bisphenol-A and the diglycidyl ether of bisphenol F, would also be of use in this invention.

The epoxy resin mixture may be modified with a portion of monofunctional epoxides, commonly referred to as diluents or reactive diluents. Examples include monoepoxides such as styrene oxide, cyclohexene oxide, ethylene oxide, propylene oxide, butylene oxide, and the glycidyl ethers of phenol, the cresols, tert-butylphenol and other alkyl phenols, butanol, 2-ethylhexanol, and mixtures of monofunctional alcohols containing from about 8 to about 18 carbon atoms and the like. They also include some diepoxides based on low molecular weight diols such as ethylene glycol, propylene glycol, butylene glycol, neopentyl glycol, 1,4-butanediol, 1,6-hexanediol, 1,4-cyclohexanedimethanol, and the like.

The epoxy resin may be used as is, it may be dissolved in an appropriate solvent, or it may be employed as an already formed emulsion in water or water/cosolvent blend. It will be recognized by those skilled in the art that the use of solvent or a water/cosolvent blend may be required with solid epoxy resins or extremely viscous liquid epoxy resins. The ratio of epoxy groups in the epoxy resin to active amine hydrogens in the hardener can vary from about 0.5 to about 2, and will depend on the nature of the epoxy resin employed and the properties necessary to meet a certain market requirement. With liquid resin, the preferred range is about 0.9 to 1.3, and with solid resin about 1.2 to 1.6.

Normally, coatings according to this invention will consist of at least two components, one of which contains the epoxy resin, and the other the curing agent. It will usually be advantageous to include one or more organic solvents in one or both components of the coating. The solvents are employed to, for example, reduce the viscosity of the individual or combined components, to reduce the surface tension of the formulation, to aid in coalescence of the ingredients for optimum film formation, to increase pot life, and to increase the stability of one or both components. Particularly useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like. Other useful solvents include the aromatic solvents such as xylene and aromatic solvent blends such as Aromatic 100, ketones such as methyl ethyl ketone, methyl isobutyl ketone, esters such as butyl acetate, and alcohols such as isopropyl alcohol and butanol. The preferred solvent is ethylene glycol monopropyl ether (EP).

It will frequently be advantageous to include plasticizers such as benzyl alcohol, phenol, tert-butylphenol, nonylphenol, octylphenol, and the like in one or both of the components. Plasticizers reduce the glass transition temperature of the composition and therefore allow the amine and epoxide to achieve a higher degree of reaction than might otherwise be possible. Accelerators for the epoxy/amine reaction may be employed in the formulation. Useful accelerators are well known to those skilled in the art and include acids such as salicylic acid, various phenols, various carboxylic acids, and various sulfonic acids, and tertiary amines such as tris-(dimethylaminomethyl)phenol.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

EXAMPLE 1

To a 1000 mL 4NRB flask equipped with a mechanical stirrer, heating mantle, Dean-Stark trap, condenser, and thermocouple was placed 145.5 g of Empol 1018 dimer fatty acid (0.249 mole). After raising the temperature to 100° C., 150 g of Jeffamine M1000 amine (available from the Huntsman Corp., 0.1245 eq 1° amine, 25.2% of composition based on solids) was added in one portion. According to the manufacturer, the Jeffamine M1000 amine had a 1° amine content of 0.83 meq/g, and a total amine content of 0.85 meq/g. This corresponds to a number average molecular weight of about 1200. The ratio of moles of diacid to equivalents of amine in the reaction is 2:1, assuming the dimer acid to be on average difunctional. A sub-surface nitrogen sparge was started, and the temperature was raised to 250° C. The temperature was held at 250° for 2.5 hr., then cooled to 100° C. During the course of the above procedures, 18 g of material were removed from the reaction mixture for various analyses. To the mixture was then added 280.6 g (2.47 eq amine) of a mixture of methylene bridged poly(cyclohexyl-aromatic)amines (MBPCAA, amine eq wt =55). With a sub-surface nitrogen sparge, the mixture was heated to 200° for 1.25 hr., then the temperature was raised to 250° for 1 hour. After raising the temperature to 250°, the mixture became quite foamy for a short period of time as water was purged from the mixture. At the completion of these treatments all absorptions due to carboxylic acid and carboxylate anion were absent from the IR spectrum. The reaction mixture was allowed to cool to 100°, and 94.1 g of EP was added through an addition funnel. The calculated amine hydrogen equivalent weight was 149.0 (124.9 based on solids), the viscosity (Brookfield CP52 spindle, 0.3 rpm, 60° C.) was 369 cP, and the % NV (1 hr., 110° C) was 83.8%. On a 100% solids basis the composition is 25.2% Jeffamine M1000 amine, 24.5% Empol 1018 dimer fatty acid, and 50.3% MBPCAA.

EXAMPLE 2

A blend that on a solids basis consists of 20.0% Jeffamine M1000 amine, 19.4% Empol 1018 dimer fatty acid, and 60.6% MBPCAA was prepared by mixing 79.37 g of the curing agent of Example 1, 3.34 g of Ektasolve EP, and 17.29 g of MBPCAA. The viscosity of the mixture (Brookfield CP52 spindle, 0.3 rpm, 60° C.) was 430 cP, the calculated % NV was 83.8%, and the calculated amine hydrogen equivalent weight was 118.0 (98.9 based on solids).

EXAMPLE 3

To a 1000 mL 4NRB flask equipped with a mechanical stirrer, heating mantle, short path condenser, sub-surface nitrogen sparge and thermocouple was placed 255 g of Empol1018 dimer fatty acid (0.437 mole). and 90 g of Jeffamine M1000 amine (0.075 eq 1° amine, 15.0% of composition based on solids). The ratio of moles of diacid to equivalents of amine in the reaction is 5.8:1, assuming the dimer acid to be on average difunctional. A sub-surface nitrogen sparge was started, and the temperature was raised to 250° C. As the temperature approached 250°, considerable bubbling occurred for a short period of time as water was purged from the system. The temperature was held at 250° for 1 hr., then cooled to about 80° C. To the mixture was then added 256 g (2.25 eq of amine) of MBPCAA. With a sub-surface nitrogen sparge, the mixture was heated to 250° for 2 hr., and again the mixture became quite foamy for a short period of time as water was purged from the mixture. The reaction mixture was allowed to cool to 100°, and 146.3 g of EP was added through an addition funnel. The calculated amine hydrogen equivalent weight was 248.6 (197.4 based on solids), the viscosity (Brookfield CP52 spindle, 0.3 rpm, 60° C.) was 4577 cP and the % solids (1 hr., 110° C.) was 79.4%. On a solids basis, the composition is 15% Jeffamine M1000 amine, 42.5% Empol 1018 dimer fatty acid, and 42.5% MBPCAA.

EXAMPLE 4

To a 1000 mL 4NRB flask equipped with a mechanical stirrer, heating mantle, short path condenser, sub-surface nitrogen sparge and thermocouple was placed 225 g of Empol 1018 dimer fatty acid (0.386 mole). and 150 g of Jeffamine M1000 amine (0.125 eq 1° amine, 24.8% of composition based on solids). The ratio of moles of diacid to equivalents of amine in the reaction is 3.08:1, assuming the dimer acid to be on average difunctional. A sub-surface nitrogen sparge was started, and the temperature was raised to 250° C. As the temperature approached 250°, considerable bubbling occurred for a short period of time as water was purged from the system. The temperature was held at 250° for 1 hr., then cooled to about 80° C. To the mixture was then added 228.8 g (2.01 eq amine) of MBPCAA. With a sub-surface nitrogen sparge, the mixture was heated to 250° for 2 hr., and again the mixture became quite foamy for a short period of time as water was purged from the mixture. The reaction mixture was allowed to cool to 100°, and 146.5 g of EP was added through an addition funnel. The calculated amine hydrogen equivalent weight was 254.9 (205.7 based on solids), the viscosity (Brookfield CP52 spindle, 0.3 rpm, 60° C.) was 1443 cP, and the % solids (1 hr., 110° C.) was 80.7%. The final composition based on solids was 24.8% Jeffamine M1000 amine, 37.3% Empol 1018 dimer fatty acid, and 37.9% MBPCAA.

EXAMPLE 5

To a 1000 mL 4NRB flask equipped with a mechanical stirrer, heating mantle, short path condenser, sub-surface nitrogen sparge and thermocouple was placed 187.5 g of Empol 1018 dimer fatty acid (0.321 mole). and 150 g of Jeffamine M1000 amine (0.125 eq 1° amine, 25.2% of composition based on solids). The ratio of moles of diacid to equivalents of amine in the reaction is 2.57:1, assuming the dimer acid to be on average difunctional. A sub-surface nitrogen sparge was started, and the temperature was raised to 250° C. As the temperature approached 250°, considerable bubbling occurred for a short period of time as water was purged from the system. The temperature was held at 250° for 1 hr., then cooled to about 80° C. To the mixture was then added 258.5 g (2.27 eq amine) of MBPCAA. With a sub-surface nitrogen sparge, the mixture was heated to 250° for 2 hr., and again the mixture became quite foamy for a short period of time as water was purged from the mixture. The reaction mixture was allowed to cool to 100°, and 147.1 g of EP was added through an addition funnel. The calculated amine hydrogen equivalent weight was 198.9 (159.5 based on solids), the viscosity (Brookfield CP52 spindle, 0.3 rpm, 60° C.) was 676 cP, and the % solids (1 hr., 110° C.) was 80.2%. On a solids basis the composition was 25.2% Jeffamine M1000 amine, 31.5% Empol 1018 dimer fatty acid, and 43.4% MBPCAA.

EXAMPLES 6–11

The A side (containing the epoxy resin) and B side (containing the hardener) clearcoat formulations of Table 1 were prepared. All of these formulations are calculated to be either 65% or 55% solids by weight, including the nonylphenol plasticizer as solids, and have a 200 g total batch weight. The level of EP is that which is calculated to yield the VOC indicated. The formulations were allowed to equilibrate for at least 15 hours. The mixtures were then combined by adding the B side to the A side and thoroughly mixing. After standing for a 30 min. induction period, the mixtures were reduced in viscosity by the addition of deionized water to a spray viscosity of about 25 sec. in a Zahn #2 cup. Coatings were prepared by drawdown using a #50 wire wound rod (Paul N. Gardner Co.) on 3"×6" polished cold rolled steel (Q Panel Co.) or 3"×6" 16 ga. grit blasted hot rolled steel with a 2 mil profile (Custom Lab Specialties Co.). Pot lives were determined by the time necessary to obtain about a 10% drop in gloss of coatings applied every half hour to cold rolled steel, by the time required for the viscosity to double, or by the time necessary for the composition to become phase separated to the extent that an accurate measure of viscosity could not be taken in the Zahn cup, whichever was a shorter time. The indicated pot lives do not include the 30 minute induction time as part of the pot life. Humidity resistance was measured using a Cleveland Condensing Humidity test (ASTM D 4585) operating with a cycle of 10 hr. wet at 40° C./2 hr. dry at 45° C. Panels were rated for visual estimation of the degree of rusting (ASTM D 610) and blistering (ASTM D 714). Performance data is collected in Table 2.

TABLE 1

| | Example | | | | | |
|---|---|---|---|---|---|---|
| | 6 | 7 | 8 | 9 | 10 | 11 |
| A Side | | | | | | |
| Epoxy Resin, EEW = 190 | 72.5 | 78.42 | 72.5 | 58.61 | 58.17 | 61.00 |
| Nonylphenol | 16.93 | 16.92 | 16.93 | 16.93 | 16.93 | 14.32 |
| Aromatic 100 | 1.45 | 1.57 | 1.45 | 1.16 | 1.16 | 1.22 |
| B Side | | | | | | |
| Hardener of Ex. 1 | 48.14 | | 48.14 | | | |
| Hardener of Ex. 2 | | 41.03 | | | | |
| Hardener of Ex. 4 | | | | 67.72 | 67.74 | |
| Hardener of Ex. 5 | | | | | | 42.95 |
| DI Water | 49.99 | 49.95 | 49.88 | 43.62 | 36.65 | 61.92 |
| EP | 10.84 | 11.84 | 10.84 | 12.21 | 19.14 | 18.36 |
| Dee-Fo P14 Concentrate | 0.25 | 0.25 | 1.25 | 0.25 | 0.25 | 0.25 |
| DI Water to Reduce to 25 sec Viscosity | 36.26 | 10.55 | 28.26 | 57.08 | 69.10 | 4.7 |
| Calculated Constants | | | | | | |
| Plasticizer on Solids | 15 | 15 | 15 | 15 | 15 | 15 |
| Eq Epoxy /Eq. N–H | 1.18 | 1.19 | 1.18 | 1.15 | 1.15 | 1.49 |
| VOC (lb/gal) | 1.20 | 1.20 | 1.20 | 1.50 | 1.80 | 1.80 |
| % Weight Solids Before Let-Down to Spray Viscosity | 65 | 65 | 65 | 65 | 65 | 55 |

Examples 1, 3, 4, and 5 show that as the ratio of moles of diacid to equivalents of amine is increased in the first step, the viscosity of the curing agent and the amine hydrogen equivalent weight increases. Both result in an increase in VOC and a decrease in application solids, as shown in Tables 1 and 2. Comparison of Examples 6 and 7 shows that by decreasing the level of Jeffamine M1000 from 25% to 20%, the application solids increases and the humidity resistance of the coating improves, while the thin film set time decreases without affecting the pot life. Experiment 8 shows that by increasing the level of defoamer employed with the hardener of Example 1, the application solids is improved along with the humidity resistance. While the overall balance of properties for most applications is superior in Example 7 which is based on the hardener of Example 2, the hardeners of Example 4 and particularly Example 5 are superior in those applications that require a high degree of film flexibility and where a relatively slow cure and a higher VOC content can be tolerated, as shown in Examples 9–11. The curing agent of Example 5 is preferred over that of Example 4 because of its lower viscosity and better humidity resistance.

TABLE 2

| | Example | | | | | |
|---|---|---|---|---|---|---|
| | 6 | 7 | 8 | 9 | 10 | 11 |
| Dry-to-touch (hr.) | 3.75 | 4.0 | 3.75 | 6.5 | 5.0 | 7.0 |
| Thin Film Set (hr.) | 11.25 | 9.5 | 13.0 | 16.5 | 18.25 | 12.25 |
| Pendulum Hardness (Rocks, 1 week cure) | 65 | 67 | 62 | 28 | 32 | 20 |
| % Rust (ASTM D610) | 1.0 | 0.3 | 0.3 | 10 | 10 | 0.5 |
| Blistering (ASTM D714) | 10 | 10 | 10 | 10 | 10 | 10 |
| Pot Life (hr.) | 5.0 | 5.0 | 4.5 | 1.5 | 5.5 | 4.5 |
| Cause of End of Pot Life | PS | PS | PS | V | PS | PS |
| Reverse Impact (in-lb) | 4 | 8 | 16 | >160 | >160 | >160 |
| Forward Impact (in-lb) | 56 | 44 | 128 | >160 | >160 | >160 |
| Initial 60° Gloss | 107 | 109 | 110 | 118 | 116 | 115 |
| First Stage Mole Acid:Eq Amine | 2.0 | 2.0 | 2.0 | 3.08 | 3.08 | 2.57 |

PS — Phase Separation
GL — Gloss Loss
V — Viscosity Increase

COMPARATIVE EXAMPLES 12–14

The formulations of Table 3 were prepared and tested according to the protocol of Examples 6–11. Anquamine 360 curing agent is a water-borne amidoamine commercially available from Air Products and Chemicals, Inc. with a % NV of 50 and an AHEW of 280. Anquamine 401 curing agent is a commercially available water-borne polyamine adduct curing agent from Air Products and Chemicals, Inc., with a % NV of 70 and AHEW of 200. EPI-REZ Resin 5522-WY-55 is a solid epoxy dispersion with an equivalent weight of 625 based on solids and a % NV of 55 and is commercially available from the Shell Chemical Co. EPI-CURE Curing Agent 8290-Y-60 is a water-borne polyamine adduct curing agent commercially available from the Shell Chemical Co. with a % NV of 60 and an equivalent weight of 163. The EPI-CURE 8290 and EPI-REZ 5522 were employed at a 15:85 weight ratio, which is recommended by the manufacturer to improve water and corrosion resistance and increase pot life relative to the stoichiometric ratio. Performance data is collected in Table 4.

TABLE 3

| | Comparative Example | | |
|---|---|---|---|
| | 12 | 13 | 14 |
| A Side | | | |
| Epoxy Resin, EEW = 190 | 53.87 | 63.02 | |
| Epi-Rez WJ-5522 | | | 138.15 |
| Benzyl Alcohol | 9.78 | 11.44 | |
| EP | 8.87 | 8.39 | 8.49 |
| Aromatic 100 | 1.28 | 1.5 | |
| B Side | | | |
| Anquamide 360 | 66.16 | | |
| Anquamine 401 | | 55.28 | |
| Epi-Cure 8290-Y-60 | | | 22.41 |
| DI Water | 49.62 | 50.22 | 30.44 |
| EP | 10.16 | 9.89 | |
| Dee-Fo P14 Concentrate | 0.25 | 0.25 | 0.25 |
| DI Water to Reduce to 25 sec Viscosity | 45.16 | 43.13 | 39.41 |
| Calculated Constants | | | |

TABLE 3-continued

| | Comparative Example | | |
|---|---|---|---|
| | 12 | 13 | 14 |
| % Plasticizer on Solids | 11.25 | 11.25 | 0 |
| Eq Epoxy/Eq N–H | 1.2 | 1.2 | 1.48 |
| VOC (lb/gal) | 1.20 | 1.20 | 2.18 |

TABLE 4

| | Example | | |
|---|---|---|---|
| | 12 | 13 | 14 |
| Dry-to-touch (hr.) | 3 | 3.25 | 1.75 |
| Thin Film Set (hr.) | 3 | 2.25 | 1.75 |
| Pendulum Hardness (Rocks, 1 week cure) | 92 | 115 | 54 |
| % Rust (ASTM D610) | 0.1 | 3 | 1 |
| Blistering (ASTM D714) | 6M | 8D | 10 |
| Pot Life (hr.) | 0.5 | <0.5 | 4.5 |
| Cause of End of Pot Life | V | V, GL | GL |
| Reverse Impact (in-lb) | <4 | 4 | 20 |
| Forward Impact (in-lb) | 20 | 52 | 112 |
| Initial 60° Gloss | 75 | 107 | 109 |

It is clear by comparison of Tables 2 and 4 that compositions of the present invention offer superior pot life and humidity resistance compared to other curing agents employed as emulsifiers for liquid epoxy resin. Compared to the solid resin dispersion and curing agent composition, the present invention offers better humidity resistance and comparable pot life along with much lower VOC and higher application solids.

STATEMENT OF INDUSTRIAL APPLICATION

The present invention provides water dispersible curing agents for liquid and solid epoxy resin coating compositions.

I claim:
1. A coating composition comprising a polyepoxide resin and an epoxy hardener composition comprising the reaction product of (A) a poly(alkylene oxide) mono- or diamine having a number average molecular weight (Mn) of 500 to 3000 and (B) a polycarboxylic acid in a ratio of moles of polycarboxylic acid to equivalents of amine of about 1:1 to 6:1 to yield an intermediate (C) which is reacted with (D) a polyamine which is selected from the group consisting of aliphatic diamines and polyamines, araliphatic diamines and polyamines, aromatic diamines and polyamines, cycloaliphatic diamines and polyamines, heterocyclic diamines and polyamines, and mixtures thereof, the amount of the poly(alkylene oxide) monoamine or diamine used to produce intermediate (C) being sufficient to provide a stable solution or emulsion of the epoxy hardener composition in an aqueous medium.

2. The coating composition of claim 1 in which the amount of the poly(alkylene oxide) monoamine or diamine used to produce intermediate (C) comprises 15 to 40 wt % of the epoxy hardener composition.

3. The coating composition of claim 1 in which the amount of the poly(alkylene oxide) monoamine or diamine used to produce intermediate (C) comprises 18 to 25 wt % of the epoxy hardener composition.

4. The coating composition of claim 1 in which the ratio of moles of polycarboxylic acid to equivalents of amine in the production of intermediate (C) ranges from 1.3:1 to 2.6:1.

5. The coating composition of claim 2 in which the ratio of moles of polycarboxylic acid to equivalents of amine in the production of intermediate (C) ranges from 1.3:1 to 2.6:1.

6. The coating composition of claim 1 in which component (A) is a poly(alkylene oxide) monoamine.

7. The coating composition of claim 1 in which the polycarboxylic acid is a dicarboxylic acid containing 3 to 12 carbon atoms.

8. The coating composition of claim 1 in which the polycarboxylic acid is a dimer fatty acid.

9. The coating composition of claim 1 in which polyamine (D) is selected from the group consisting of polyethylene amines, 1,2-propylenediamine, 1,3-propylene-diamine, 1,4-butanediamine, 1,5-pentanediamine, 1,3-pentanediamine, 1,6-hexanediamine, 3,3,5-trimethyl-1,6-hexanediamine, 3,5, 5-trimethylol ,6-hexanediamine, 2-methyl-1,5-pentanediamine, bis-(3-aminopropyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazine, meta-xylylenediamine, phenylenediamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexyl methane, the mixture of methylene bridged poly(cyclohexyl-aromatic)amines, polyaminoamides, and mixtures thereof.

10. The coating composition of claim 1 in which polyamine (D) is 4,4'-diaminodicyclohexyl methane.

11. The coating composition of claim 1 in which polyamine (D) is a mixture of methylene bridged poly(cyclohexyl-aromatic)amines.

12. A coating composition comprising a polyepoxide resin and an epoxy hardener composition comprising the reaction product of (A) a poly(alkylene oxide) mono- or diamine having a number average molecular weight (Mn) of 500 to 3000 and (B) a dicarboxylic acid in a ratio of moles of dicarboxylic acid to equivalents of amine of about 1.3:1 to 6:1 to yield an intermediate (C) which is reacted with (D) a polyamine which is selected from the group consisting of aliphatic diamines and polyamines, araliphatic diamines and polyamines, aromatic diamines and polyamines, cycloaliphatic diamines and polyamines, heterocyclic diamines and polyamines and mixtures thereof, the amount of the poly(alkylene oxide) monoamine or diamine used to produce intermediate (C) being 15 to 40 wt % of the epoxy hardener composition.

13. The coating composition of claim 12 in which the amount of the poly(alkylene oxide) monoamine or diamine used to produce intermediate (C) comprises 18 to 25 wt % of the epoxy hardener composition.

14. The coating composition of claim 12 in which the ratio of moles of dicarboxylic acid to equivalents of amine in the production of intermediate (C) ranges from 1.3:1 to 2.6:1.

15. The coating composition of claim 12 in which component (A) is a poly(alkylene oxide) monoamine.

16. The coating composition of claim 12 in which the dicarboxylic acid contains 3 to 12 carbons atoms.

17. The coating composition of claim 12 in which the dicarboxylic acid is a dimer fatty acid.

18. The coating composition of claim 12 in which polyamine (D) is selected from the group consisting of polyethylene amines, 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)-1,2-ethanediamine, N-(3-aminopropyl)-1, 2-ethanediamine, 1,2-diaminocyclohexane, 1,3-diaminocyclohexane, 1,4-diaminocyclohexane, aminoethylpiperazine, meta-xylylenediamine, phenylenediamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexyl methane, the mixture of methylene bridged poly(cyclohexyl-aromatic)amines, polyaminoamides, and mixtures thereof.

19. The coating composition of claim 14 in which polyamine (D) is 4,4'-diaminodicyclohexyl methane.

20. The coating composition of claim 14 in which polyamine (D) is a mixture of methylene bridged poly(cyclohexyl-aromatic)amines.

21. A coating composition comprising a polyepoxide resin and an epoxy hardener composition comprising the reaction product of (A) a poly(alkylene oxide) monoamine having a number average molecular weight (Mn) of 800 to 1500 and (B) a dicarboxylic acid in a ratio of moles of dicarboxylic acid to equivalents of amine of about 1.3:1 to 2.6:1 to yield an intermediate (C) which is reacted with (D) a polyamine, the amount of the poly(alkylene oxide) monoamine used to produce intermediate (C) being 18 to 25 wt % of the epoxy hardener composition.

22. The coating composition of claim 21 in which polyamine (D) is 4,4'-diaminodicyclohexyl methane.

23. The coating composition of claim 21 in which polyamine (D) is a mixture of methylene bridged poly(cyclohexyl-aromatic)amines.

24. The coating composition of claim 21 in which the poly(alkylene oxide) monoamine is a monoamine terminated block copolymer of propylene oxide and ethylene oxide having an Mn of about 1200 based on its amine titer.

25. The coating composition of claim 21 in which the dicarboxylic acid (B) is selected from the group consisting of a dicarboxylic acid containing 3 to 12 carbons atoms and a dimer fatty acid.

26. A coating composition comprising a polyepoxide resin and an epoxy hardener composition comprising the reaction product of (A) a poly(alkylene oxide) monoamine having a number average molecular weight (Mn) of 500 to 3000 and (B) a polycarboxylic acid in a ratio of moles of polycarboxylic acid to equivalents of monoamine of about 1:1 to 6:1 to yield an intermediate (C) which is reacted with (D) a polyamine, the amount of the poly(alkylene oxide) monoamine used to produce intermediate (C) being sufficient to provide a stable solution or emulsion of the epoxy hardener composition in an aqueous medium.

\* \* \* \* \*